United States Patent
Gentry

[11] Patent Number: 5,971,247
[45] Date of Patent: Oct. 26, 1999

[54] FRICTION STIR WELDING WITH ROLLER STOPS FOR CONTROLLING WELD DEPTH

[75] Inventor: William Ramon Gentry, Metairie, La.

[73] Assignee: Lockheed Martin Corporation, New Orleans, La.

[21] Appl. No.: 09/036,915

[22] Filed: Mar. 9, 1998

[51] Int. Cl.[6] .............................. B23K 20/12; B23K 5/22; B23K 37/00
[52] U.S. Cl. ...................... 228/2.1; 228/112.1; 228/56.5; 156/580
[58] Field of Search .............................. 228/2.1, 45, 56.5, 228/112.1; 156/73.1, 580; 408/201

[56] References Cited

U.S. PATENT DOCUMENTS

| | | | |
|---|---|---|---|
| 3,937,918 | 2/1976 | Robertson | 219/124.31 |
| 5,391,857 | 2/1995 | Pompey | 219/124.31 |
| 5,460,317 | 10/1995 | Thomas et al. | 228/112.1 |
| 5,697,511 | 12/1997 | Bampton | 220/4.12 |
| 5,697,544 | 12/1997 | Wykes | 228/2.1 |
| 5,713,507 | 2/1998 | Holt et al. | 228/112.1 |
| 5,718,366 | 2/1998 | Colligan | 228/112.1 |
| 5,769,306 | 6/1998 | Colligan | 228/112.1 |
| 5,829,664 | 11/1998 | Spinella et al. | 228/112.1 |
| 5,893,507 | 4/1999 | Ding et al. | 228/2.1 |

*Primary Examiner*—Patrick Ryan
*Assistant Examiner*—Carlos J. Gamino
*Attorney, Agent, or Firm*—W. H. Meise; T. G. Fierke

[57] ABSTRACT

Stir friction welding is accomplished by applying force to plunge a nonconsumable, rotating welding post into the region to be welded. The rotation creates friction which at least partially melts the material to be welded, as the welding post penetrates. The force is continued, causing the post to continue to penetrate. A set of rollers associated with the welding head eventually reaches the surface of the workpiece when the welding post reaches the proper depth, and prevents further penetration of the welding post. In one embodiment of the invention, the rollers have crowned surfaces, and the force is applied by a hydraulic cylinder.

9 Claims, 4 Drawing Sheets

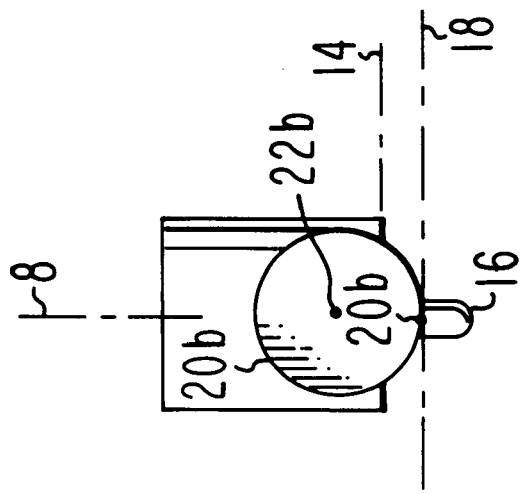
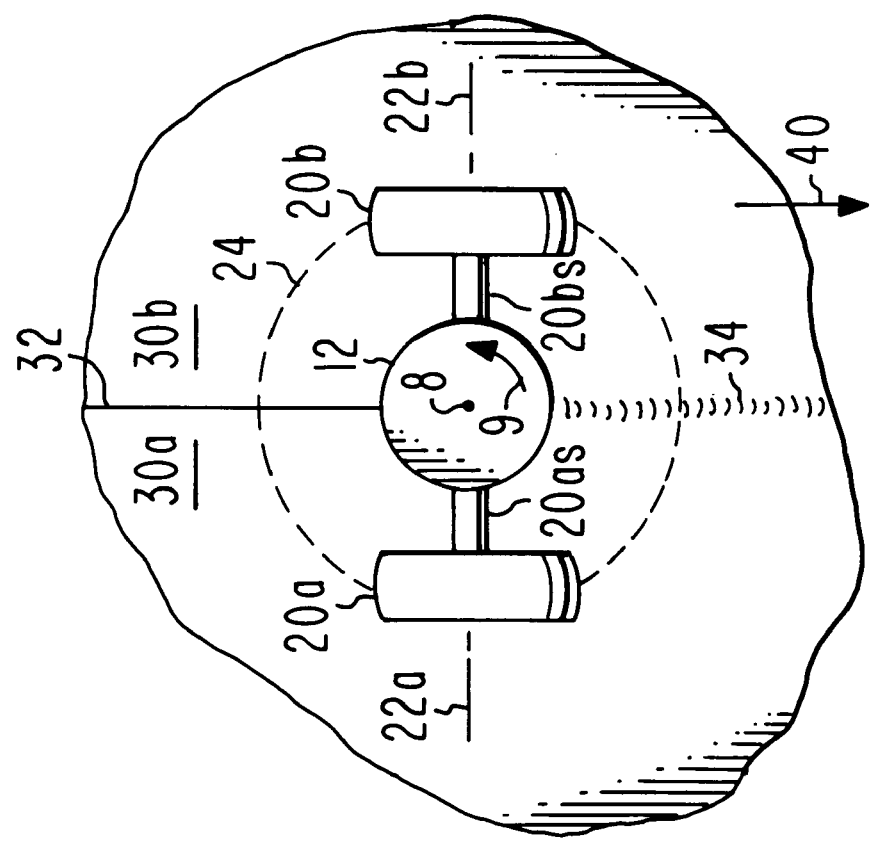

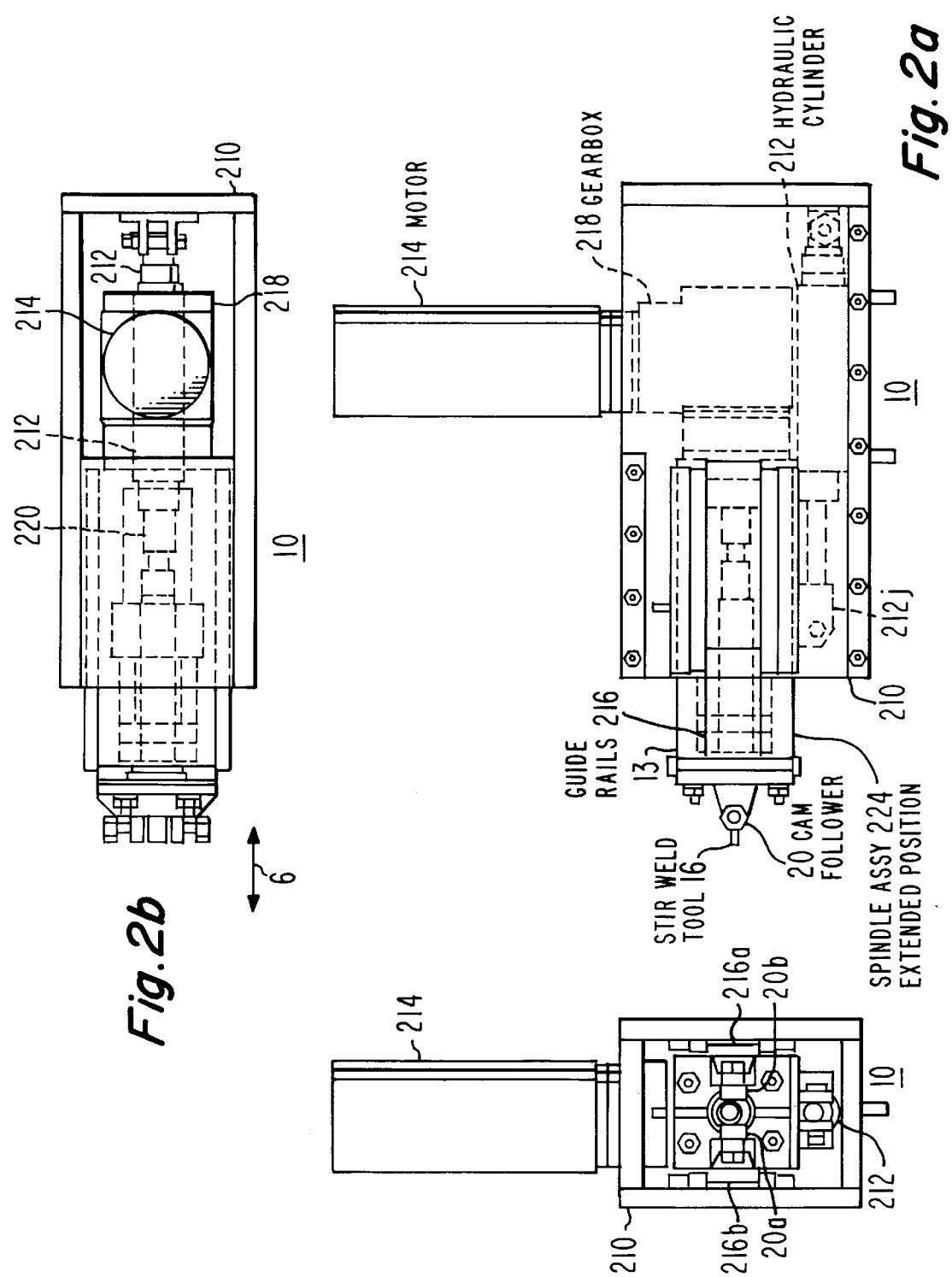

FRICTION STIR WELDING WITH ROLLER STOPS FOR CONTROLLING WELD DEPTH

FIELD OF THE INVENTION

This invention relates to welding, and more particularly to stir-friction welding.

BACKGROUND OF THE INVENTION

Butt-welding plates by plunge stir friction using a rotating post inserted into the joint is known, and described, for example, in U.S. Pat. No. 5,460,317, issued Oct. 24, 1995 in the name of Thomas et al. As described therein, the welding head with its projecting post or probe is pressed against the plates to be welded. This arrangement has several disadvantages, including a tendency to heat portions of the workpieces at regions far from the joint to high temperatures, additional mechanical resistance and wear on the welding machine attributable to the energy going into the heating of regions far from the joint being welded, the cost of the energy required to drive the welding head subject to excess mechanical resistance, and surface deformation of those portions of the workpiece far from the joint. Improved stir weld arrangements are desired.

SUMMARY OF THE INVENTION

A stir friction welding apparatus according to the invention includes a rotatable stir friction welding head lying on a first side of a first plane, and defining a distal end at the first plane. The welding head cantilever-supports the proximal end of a stir friction welding post lying on a second side of the first plane. The welding post is coaxial with the axis of rotation of the welding head. The welding post also including a distal end, and rotates in consonance with the rotation of the welding head. A second plane which is parallel with the first plane passes transversely through the welding post at a location lying between the first plane and the distal end of the welding post. The welding apparatus also includes a plurality of rollers, each of which has a shaft about which the roller can be rotated. The shaft of each of the rollers is affixed to the welding head, with the axis of rotation of each of the rollers relative to its respective shaft being radial relative to the axis of rotation of the welding head. The rollers traverse a circular path about the axis of rotation of the welding head in response to rotation of the welding head. Each of the rollers lies on that first side of the second plane which includes the first plane, or in which the first plane lies. Each of the rollers is tangent to the second plane. The welding apparatus further includes a support arrangement coupled to the welding head, for supporting the welding head against movement in directions orthogonal to the axis of rotation, but allowing motion of the welding head parallel to the axis of rotation. A force-applying arrangement is mechanically coupled to the support arrangement and to the welding head, for applying force tending to move the welding head, and its welding post and rollers, toward a workpiece. As a result of this arrangement, rotation of the welding head, the welding post, and the rollers while applying force to the welding head tends to insert or plunge the rotating welding post into the workpiece until the rollers contact the workpiece. The resistance of the rollers contacting or rolling on the workpiece tends to resist the force on the welding head, and transfers the force to the workpiece. This, in turn, tends to hold the workpiece in a flat state. The number of rollers in one embodiment of the invention is two.

A method for welding a butt joint in adjoining pieces including flat regions includes the step of placing the two flat regions with their edge regions to be welded contiguous, so as to define a seam region between the flat regions. The method includes the further steps of providing a stir weld head with a stir weld post located in the seam region between the flat regions, and of rotating the stir weld head to thereby rotate the stir weld post to thereby heat the seam region by friction and form a welded butt joint between the flat regions. Relative motion is provided between the stir weld head and the flat regions so as to move the stir weld post along the length of the seam region. The stir weld head is pressed or forced toward the flat regions during the step of rotating the stir weld head, to thereby tend to force the stir weld post further into the seam region. The pressing is resisted with rollers located between the stir weld head and the flat regions, which transfer the force to the flat regions, to thereby tend to hold the flat regions firmly in place, without introducing additional welding friction at the locations at which the rollers contact the flat regions. The flat regions may be portions of flat plates.

BRIEF DESCRIPTION OF THE DRAWING

FIG. 1b is a plan view of the arrangement of FIG. 1a looking in the direction of arrows 1b—1b, and FIG. 1c is a side elevation view of the arrangement of FIG. 1b;

FIGS. 2a, 2b, and 2c are side elevation, top plan, and frontal views of a welding apparatus in accordance with an aspect of the invention.

DESCRIPTION OF THE INVENTION

Figure 1A:
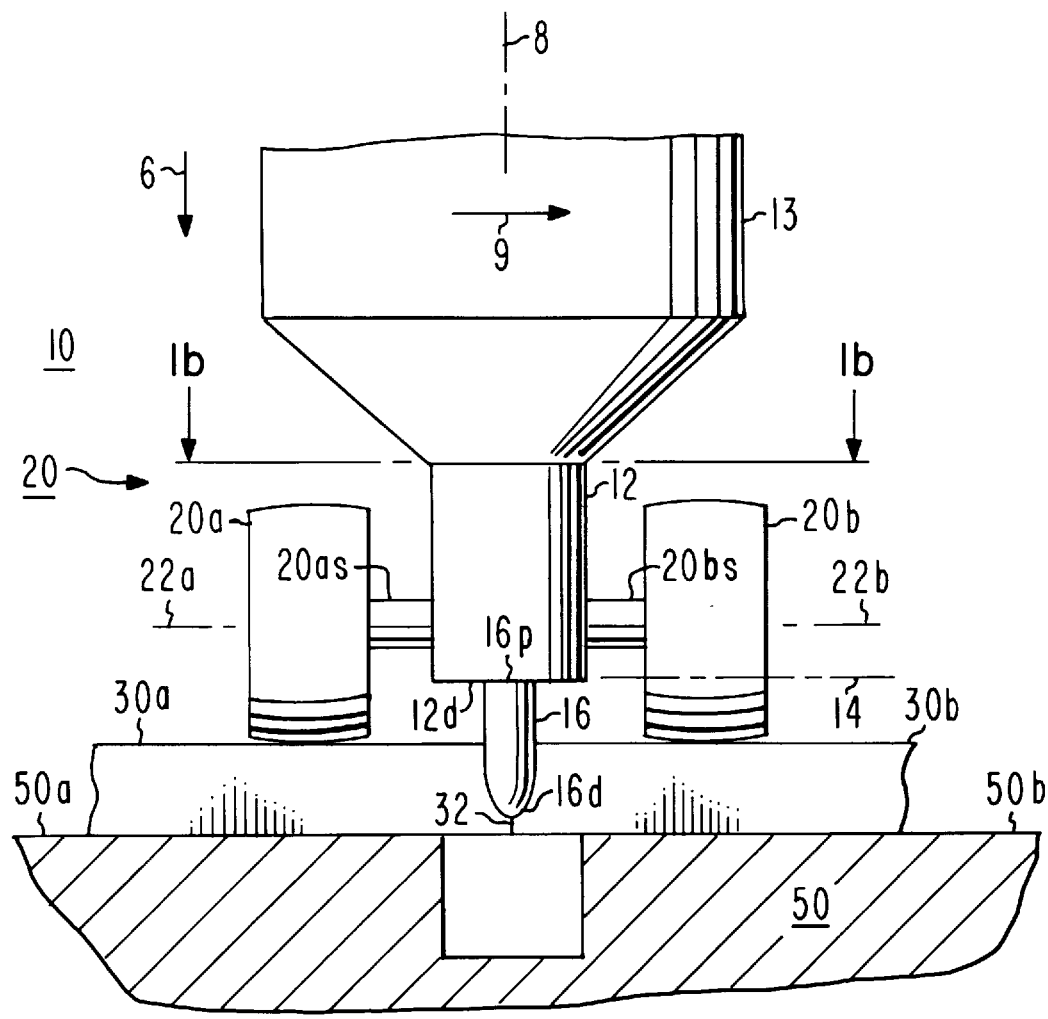
FIG. 1a is a simplified side elevation view of a portion of a welding head and stir-friction welding post or pin in a workpiece, all in accordance with the invention.

In FIGS. 1a, 1b, and 1c, a stir friction welding head 12 is supported by a support element 13, and rotates about an axis of rotation 8. Welding head 12 has a distal end 12d which is contiguous with a plane 14 which is transverse or orthogonal to axis of rotation 8, and supports, in cantilever fashion, the proximal end 16p of a nonconsumable welding post 16. Welding post 16 also has a free distal end 16d.

A portion of welding post 16 projects past a second plane 18, which is parallel with plane 14, and into the unwelded seam lying between flat portions of mutually adjacent workpieces 30a and 30b, which are supported by a support arrangement or backing bar illustrated as a bipartite arrangement 50 including portions 50a and 50b. Rotation of welding head support 13 in the direction of arrows 9 causes the welding post 16 to rotate, and to heat the seam region 32 by friction. Those skilled in the art know that relative movement of the workpieces relative to the rotating welding post 16, as suggested by arrow 40 of FIG. 1b, causes the seam region 32 to become a welded region 34.

Various effects can result in welding of the adjacent flat portions 30a, 30b of the workpieces or plates with the upper surfaces not in exactly the same plane. This can occur, for example, if the supports 50 for the workpieces 30a, 30b, or the workpieces themselves, are not completely flat. Movement of the workpieces 30a, 30b relative to each other may occur due to the rotational movement of the welding post 16 in the seam region 32 between the plates 30a, 30b.

If the welding head 12 of FIGS. 1a, 1b, and 1c were to be lowered into contact with the upper surfaces of the workpiece as illustrated in the abovementioned Thomas et al. patent, friction would occur between the distal end 12d of the welding head and portions of the workpieces at some distance from the seam to be welded. This frictional force occurs on a larger radius than that of the welding post, and so the mechanical resistance has a greater lever arm than that of the friction due to the welding post. This larger lever arm results in a greater rotation-retarding torque, which must be overcome by application of a correspondingly larger rotational drive torque. The additional torque requires more drive energy, which is costly. In addition to being costly, the additional energy does not go into the weld region, but rather into the surface of the workpieces at a distance from the seam to be welded, and may score or otherwise deform or deface the surface of the workpieces.

According to an aspect of the invention, the arrangement of FIGS. 1a, 1b, and 1c includes a set 20 of a plurality, illustrated as two, of rollers 20a and 20b, which are supported by, and rotate about, shafts 20as and 20bs, respectively, and about roller rotational axes 22a and 22b. The shafts 20as and 20bs are affixed to the welding head 12 at a location selected so that the rollers are tangent to plane 18, or in other words so that the rollers contact, or are tangent to, the upper surfaces of the workpieces, when the distal end 16d of welding post 16 is at the desired depth of penetration into the seam 32 between the flat portions of the workpieces 30a, 30b. The point of tangency is illustrated as 20bt in FIG. 1c. It will be clear that the centers of the rollers rotate on a circle illustrated as 24 in FIG. 1b in response to rotation 9 of the welding head support 13 and the welding head 12. Force applied in the direction of arrow 6 of FIG. 1 to the welding head support 13 and the welding head 12 will tend to drive the rotating welding post 16 deeper into the seam 32 between the flat portions or plates 30a, 30b, until the rollers 20a, 20b contact the upper surfaces of the workpieces. Additional force will not cause any further penetration of the welding post 16 into the seam region 32, although of course unlimited increases of the force, were they to be permitted, might result in breaking some portion of the apparatus or workpiece.

In FIGS. 2a, 2b, and 2c, elements corresponding to those of FIGS. 1a, 1b, and 1c are designated by like reference numerals. In FIGS. 2a, 2b, and 2c, a body 210 supports a motor 214, which drives a gearbox 218. The shaft of gearbox 218 rotationally drives welding head support 13 by means of a shaft 220. Since the motor 214, gearbox 218, and spindle assembly 224 move as a whole relative to the body 210, there is no need for an adjustable coupling. Welding head support 13 is carried on an axially movable spindle 224, which is guided by a set 216 of two guide rails 216a, 216b. A hydraulic cylinder 212 is connected at one end to support body 210, and its other end is connected by a joint 212j to the spindle 224, for, when pressurized with hydraulic fluid, tending to drive the spindle, and the rotating welding head support 13, to the left as illustrated in FIG. 2a, which corresponds to a direction toward the workpieces in FIGS. 1a, 1b, and 1c. In one embodiment of the invention, the rollers are in the form of cam followers with crowned roller surfaces, which tend to reduce scraping of the upper surfaces of the workpieces than would rollers with flat cross-sectional rolling surfaces.

Figure 3:
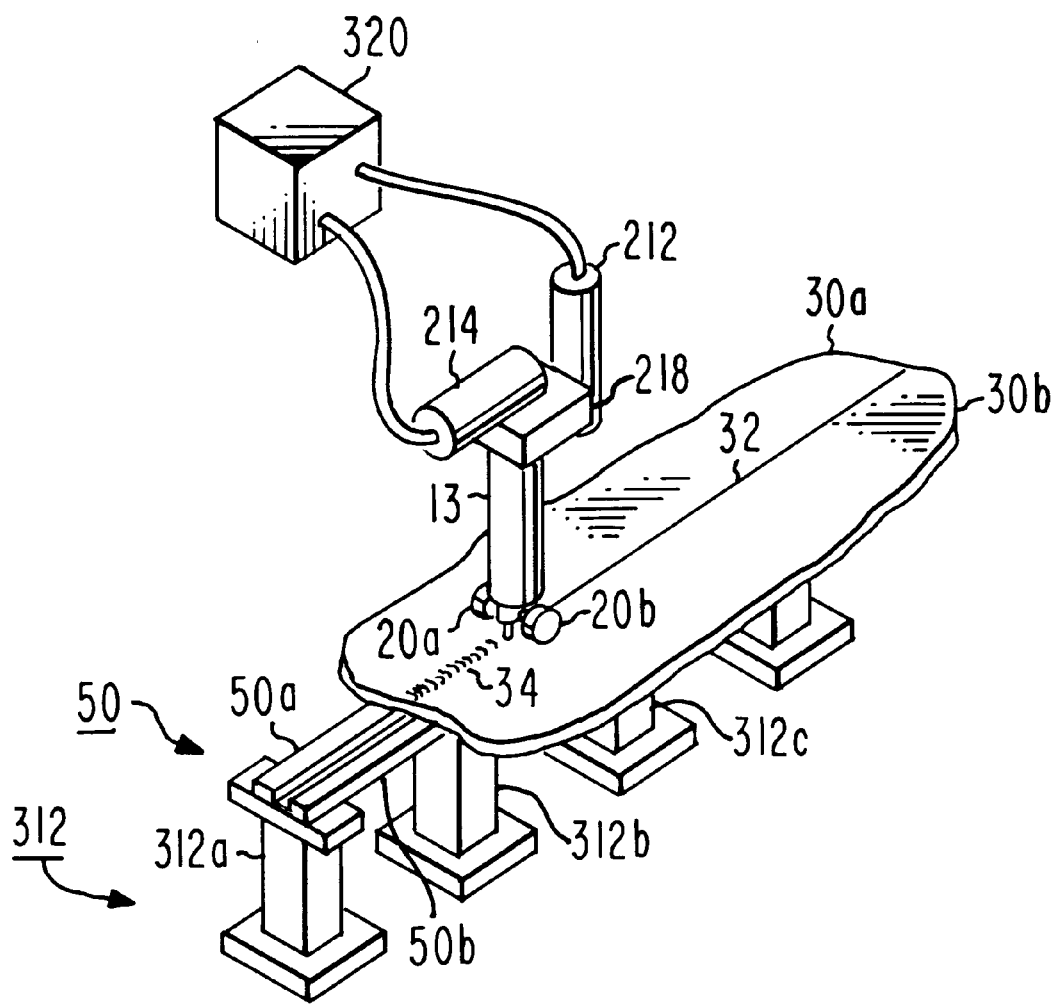
FIG. 3 is a simplified perspective or isometric view of a workpiece supported on a backing bar, being welded by the apparatus of FIGS. 1a, 1b, 1c, 2a, 2b, and 2c in conjunction with a source of constant pressure.

FIG. 3 illustrates the workpieces 30a and 30b mounted on bipartite backing plate 50, which in turn is supported at locations along its length by a support 312 in the form of plural columns 312a, 312b, 312c, . . . . The welding head support 13, rollers 20a and 20b, gearbox 218, motor 214, and hydraulic cylinder 212 are also illustrated. A block illustrated as 320 represents a source of electrical energy for driving motor 214, and also represents a source of constant hydraulic pressure, which is applied to hydraulic cylinder 212 during operation to provide a constant force exceeding that required to drive the rotating welding post (not visible in FIG. 3) into the seam region 32 between the plates of the workpiece 30a, 30b. In operation of the described arrangement, constant force is applied to the welding head to tend to move it toward the workpiece, and the welding head is rotated, which also rotates the welding post. Since the applied force exceeds that required to cause the welding post to penetrate the seam, the rotating welding post will eventually enter or plunge into the seam region, and welding will begin. The force is maintained constant, and the rotation continued, until the welding post has plunged to a depth which brings the rollers into contact with the upper surfaces of the workpieces being joined. The rollers react the difference between the applied downward force and upward reaction at the welding post, and the rollers therefore track the surface, and clamp the workpieces against the backing bar 50a, 50b. Relative motion is then begun between the workpieces and the welding post, as by moving one or the other in the direction of the seam. As the welding post moves along the seam 32 to create the weld 34, the backing bar may deflect away from the welding head in the region between the support columns 312a, 312b, 312c, . . . . The deflection of the backing bar tends to cause the work to move away from the welding head, and therefore tends to affect the depth of penetration of the welding post. The regulation of the force applied to the welding head by means of the constant pressure applied to the hydraulic cylinder tends to maintain the welding head at a constant distance from the upper surface of the workpieces notwithstanding deflection of the underlying support as the weld moves along the seam, and therefore tends to maintain constant penetration of the welding post.

Other embodiments of the invention will be apparent to those skilled in the art. For example, the motor 214 and gearbox 218 may be fixed relative to body 210, in which case the connection of the gearbox drive shaft to the rotational spindle assembly 224 might be made by means of a splined connection long enough so that the welding head support 13 can move axially in directions 6, without losing drive torque from the gearbox.

Thus, a stir friction welding apparatus (10) according to the invention includes a rotatable stir friction welding head (12) lying on a first (upper in FIG. 1a) side of a first plane (14), and defining a distal end (12d) at the first plane (14). The welding head (12) cantilever-supports the proximal end (16p) of a stir friction welding post (16) lying on a second (lower in FIG. 1a) side of the first plane (14). The welding post (16) is coaxial with the axis of rotation (8) of the welding head (12). The welding post (16) also including a distal end (16d), and rotates in consonance with the rotation of the welding head (12). A second plane (18) which is parallel with the first plane (14) passes transversely through the welding post (16) at a location lying between the first plane (14) and the distal end (16d) of the welding post (16). The welding apparatus (10) also includes a plurality (two) of rollers (20a, 20b), each of which has a shaft (20as, 20bs) about which the roller (20a, 20b) can be rotated. The shaft (20as, 20bs) of each of the rollers (20a, 20b) is affixed to the welding head (12), with the axis of rotation (22a, 22b) of each of the rollers (20a, 20b) relative to its respective shaft (20as, 20bs) being radial relative to the axis of rotation (8) of the welding head (12). The rollers (20a, 20b) traverse a circular path (24) about the axis of rotation (8) of the welding head (12) in response to rotation of the welding head (12). Each of the rollers (20a, 20b) lies on that first (upper) side of the second plane (18) which includes the first plane (14), or in which the first plane (14) lies. Each of the rollers (20a, 20b) is tangent (at point 20bt) to the second plane (18). The welding apparatus (10) further includes a support arrangement (210) coupled to the welding head (12), for supporting the welding head (12) against movement in directions orthogonal to the axis of rotation (8), but allowing motion (6) of the welding head (12) parallel to the axis of rotation (8). A force-applying arrangement (212) is mechanically coupled to the support arrangement (210) and to the welding head (12), for applying force tending to move the welding head (12), and its welding post (16) and rollers (20a, 20b), toward a workpiece (30a, 30b, 32). As a result of this arrangement, rotation of the welding head (12), the welding post (16), and the rollers (20a, 20b) while applying force to the welding head (12) tends to insert or plunge the rotating welding post (16) into the workpiece (30a, 30b, 32) until the rollers (20a, 20b) contact the workpiece. The resistance of the rollers (20a, 20b) contacting or rolling on the workpiece tends to resist the force on the welding head (12), and transfers the force to the workpiece. This, in turn, tends to hold the workpiece in a flat state. The number of rollers (20a, 20b) in one embodiment of the invention is two.

A method for welding a butt joint (34) in adjoining pieces (30a, 30b) including flat regions includes the step of placing the two flat regions with their edge regions to be welded contiguous, so as to define a seam (36) region between the flat regions. The method includes the further steps of providing a stir weld head (12) with a stir weld post (16) located in the seam region (36) between the flat regions (30a, 30b), and of rotating the stir weld head (9) to thereby rotate the stir weld post (16) to thereby heat the seam (36) region by friction and form a welded butt joint (34) between the flat regions. Relative motion (40) is provided between the stir weld head (12) and the flat regions (30a, 30b) so as to move the stir weld post (16) along the length of the seam region (36). The stir weld head (12) is pressed or forced toward the flat regions (30a, 30b) during the step of rotating (9) the stir weld head (12), to thereby tend to force the stir weld post (16) further into the seam (36) region. The pressing is resisted with rollers (20a, 20b) located between the stir weld head and the flat regions, or connected to the stir weld head (12) and in contact with the flat regions (30a, 30b), which transfer the force to the flat regions, to thereby tend to hold the flat regions firmly in place, without introducing additional welding friction at the locations at which the rollers (20a, 20b) contact the flat regions. The flat regions may be portions of flat plates.

What is claimed is:

1. A method for welding a butt joint in adjoining flat plates defining a seam region therebetween, said method comprising the steps of:

providing a stir weld head with a stir weld post located in said seam region between said flat plates;

rotating said stir weld head to thereby rotate said stir weld post to thereby heat said seam region by friction and form a welded butt joint between said flat plates;

providing relative motion between said stir weld head and said flat plates so as to move said stir weld post along the length of said seam region;

pressing said stir weld head toward said flat plates during said step of rotating said stir weld head, to thereby tend to force said stir weld post further into said seam region; and resisting said pressing with rollers located between said stir weld head and said plates, which transfers said force to said plates, to thereby tend to hold said plates firmly in place, without introducing additional welding friction at the locations of said rollers.

2. A method according to claim 1, wherein said step of pressing includes the step of pressing with a constant force.

3. A method according to claim 2, wherein said step of pressing with a constant force includes the step of applying constant fluid pressure to a pressure cylinder connected to said stir weld head.

4. A stir friction welding apparatus, comprising:

a rotatable stir friction welding head on a first side of a first plane, and defining a distal end at said first plane, said welding head cantilever-supporting a proximal end of a stir friction welding post lying on a second side of said first plane, said friction welding post being coaxial with the axis of rotation of said welding head and also including a distal end, for rotating in consonance with said welding head, a second plane parallel with said first plane passing transversely through said welding post at a location lying between said first plane and said distal end of said welding post;

a plurality of rollers, each of which has a shaft about which the roller can be rotated, said shaft of each of said rollers being affixed to said welding head, with the axis of rotation of each of said rollers relative to its respective shaft being radial relative to said axis of rotation of said welding head, said rollers traversing a circular path about said axis of rotation of said welding head in response to rotation thereof, each of said rollers lying on that first side of said second plane which includes said first plane, and each of said rollers being tangent to said second plane;

support means coupled to said welding head, for supporting said welding head in directions orthogonal to said axis of rotation, but allowing motion parallel to said axis of rotation;

force-applying means coupled to said support means and to said welding head, for applying force tending to move said welding head, and its welding post and rollers, toward a workpiece, whereby rotation of said welding head, said welding post, and said rollers while applying force to said welding head tends to insert the rotating welding post into said workpiece until said rollers contact said workpiece, whereby the resistance of said rollers contacting said workpiece tends to resist said force, and transfers said force to said workpiece.

5. An apparatus according to claim 4, wherein said plurality of rollers is two.

6. An apparatus according to claim 4, wherein said rollers have crowned rolling surfaces.

7. An apparatus according to claim 4, wherein said force-applying means comprises a fluid cylinder.

8. An apparatus according to claim 7, wherein said fluid cylinder comprises a hydraulic cylinder.

9. An apparatus according to claim 7, wherein said force-applying means further comprises a source of constant fluid pressure coupled to said fluid cylinder.

* * * * *